United States Patent Office 2,695,991
Patented Nov. 30, 1954

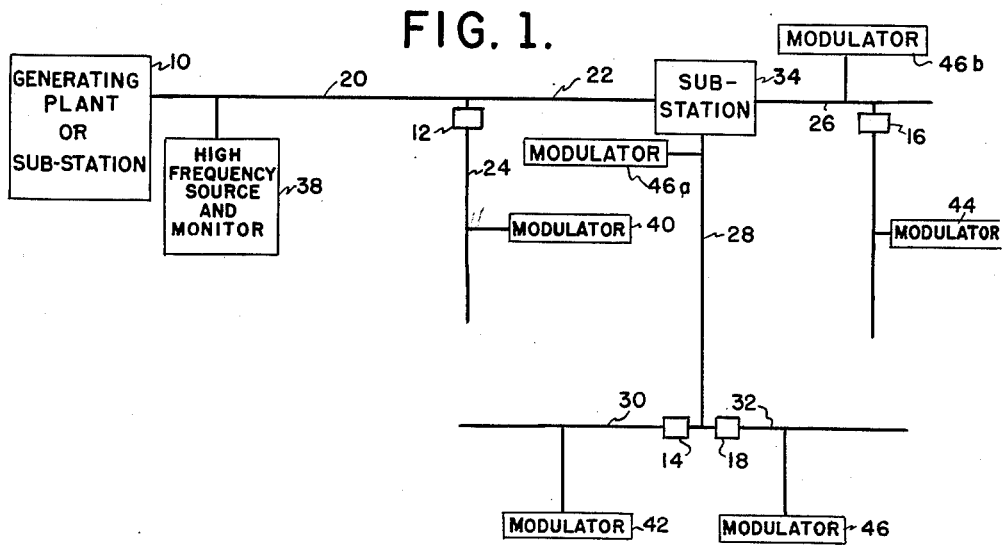
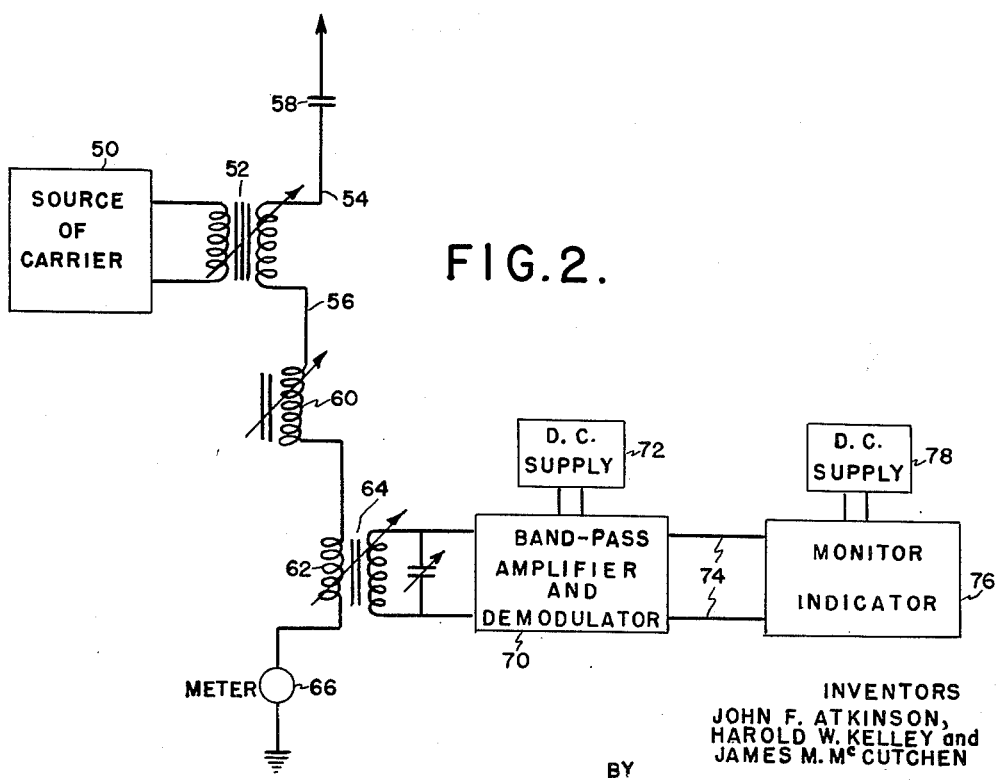

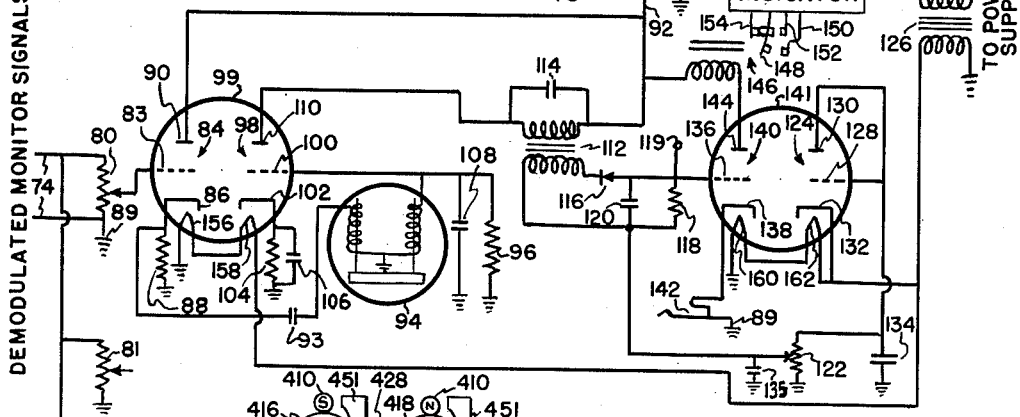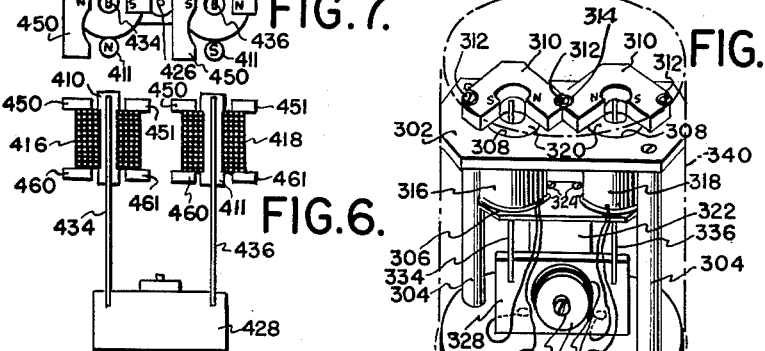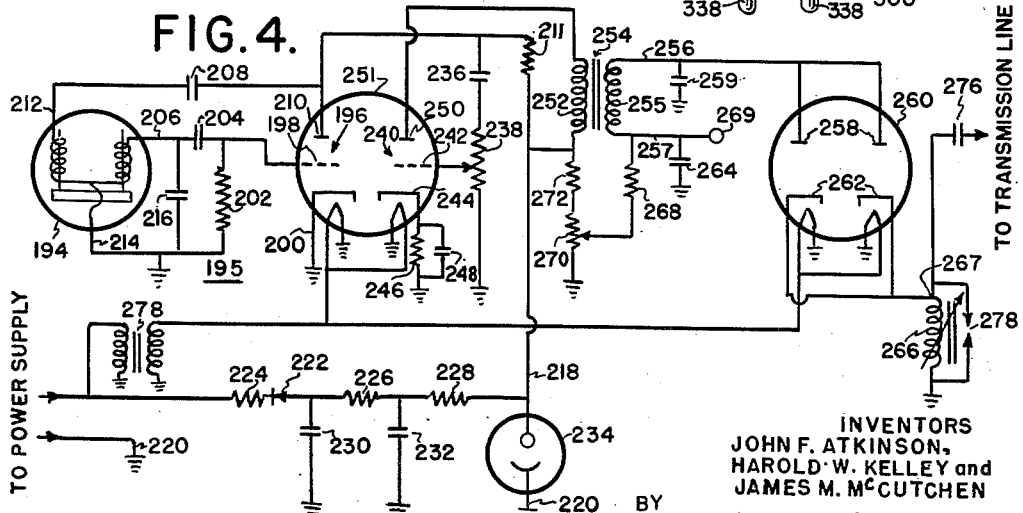

2,695,991

REMOTE MONITORING SYSTEM

John F. Atkinson, Harold W. Kelley, and James M. McCutchen, Arlington County, Va., assignors to Sprague Electric Company, North Adams, Mass., a corporation of Massachusetts Application July 1, 1950, Serial No. 171,628

4 Claims. (Cl. 340—163)

This invention relates to remote monitoring systems, particularly systems with which a large number of different conditions can be monitored at a single remote location.

The prior Alkinson et al., U. S. patent application Serial No. 757,422 filed June 27, 1947, now Patent No. 2,574,458, describes remote monitoring systems in which a high frequency carrier wave is impressed between a pair of electrical conductors, and modulated at a multiplicity of different individual low frequencies in accordance with a corresponding number of remote conditions to be simultaneously monitored. At a single location the presence of these individual modulating frequencies are detected, identified and indicated.

Unfortunately, practical limitations on the spacing of modulating frequencies severely limit the number of different conditions that they can monitor with a single unit of these prior systems. In addition the prior systems depend upon the operation of vibratory circuit-breaking contacts in the detection of the individual modulation frequencies. Such contacts have a relatively limited life and generate undesired harmonics to such an extent that the harmonics may act as spurious signals interfering with the monitoring. Moreover, the vibratory contacts often become welded or stuck in a position that causes the monitoring to give false and misleading indications.

Among the objects of the present invention are novel remote monitoring systems that avoid the above and related difficulties.

It is a more specific object of the present invention to provide novel remote monitoring systems capable of monitoring a relatively large number of individual conditions per system.

A further object of the present invention is the provision of novel remote monitoring systems that are relatively simple and devoid of vibratory circuit-breaking contacts.

A still further object of the present invention is the provision of novel modulators and indicators that can be used with the above remote monitoring systems.

Another object of the present invention is the provision of novel remote monitoring systems and indicators that are substantially fool-proof in operation.

The above as well as additional objects of the invention will be more readily understood from the following description of several of its exemplifications, considered together with the appended drawings wherein:

Fig. 1 is a schematic representation of an electric power transmission system including a remote monitoring system of the invention;

Fig. 2 is a schematic showing of a combined high frequency source and monitor illustrative of the invention;

Fig. 3 is a wiring diagram of a monitor construction exemplifying the present invention;

Fig. 4 is a wiring diagram of a modulator construction according to the invention;

Fig. 5 is a detail perspective view of one form of contactless mechanically selective signal transfer unit suitable for use in accordance with the invention; and Figs. 6 and 7 are fragmentary, vertical, sectional, and plan views, respectively, of a modified contactless mechanically-selective signal transfer unit suitable for use in the constructions of the invention.

It has been discovered that the number of different operating conditions that can be monitored by a single remote monitoring system of the above-described type, is multiplied severalfold when a contactless mechanically-selective low frequency signal transfer unit is utilized for effecting the low frequency selectivity. Furthermore a selective transfer unit of this type does not rely on vibrating circuit-breaking contacts and has a normal life of indefinite length.

According to the present invention a contactless mechanically-selective low frequency signal transfer unit can be used both in the modulator section and in the monitor section, of the above monitoring system, or in only one of these sections if the full advantages of the invention are not desired. It has also been discovered that extremely efficient modulation can be obtained by using as a modulator a series resonant carrier current load circuit of a capacitor joined to an inductor, with circuit elements connected at the juncture to sinusoidally vary the impedance of the resonant combination. In a more limited sense, the circuit elements that introduce the sinusoidal variations can include a biased control member having leads between which it inserts a resistance that is varied, by a bias voltage, between substantially infinity and a relatively low value, and a second capacitor, one of the control member leads being connected to the joined terminals of the inductor and the capacitor, the other lead being connected through the second capacitor to the other terminal of the inductor.

According to another phase of the present invention the monitoring of the above type of remote monitoring system is improved by effecting it with individual contactless mechanically-selective audio frequency transfer units, one for each modulation frequency and each substantially isolated from each other and of substantially fool-proof construction. The substantially fool-proof characteristics are contributed by a combination of a biased power-amplifying indicator stage dependent upon a bias supply for normal operation, the bias supply and the power-amplifying stage being energized in series so that failure of the bias supply will give a positive indication through failure of the amplifying stage.

Referring specifically to Fig. 1, there is here shown an electric power transmission system in which a generating plant 10, or other power source, is connected to a power transmission and distribution system consisting of conductors indicated at 20, 22, 24, 26, 28, 30 and 32. A substation is shown at 34 for transforming the voltage supplied by conductor 20 to a value more suitable for further transmission or distribution. Line clearing devices such as conventional rapidly acting circuit breakers may also be connected in the line, as shown at 12, 14, 16 and 18 to open the line circuit in the event of a short in the portion of the line on the load side of a breaker.

The remote monitoring system of the invention is applied to the transmission line system of Fig. 1, by connecting to the line at some convenient monitoring location, as at 38 a combination high frequency carrier supply and monitor. At points where it is desired to monitor the presence or absence of line voltage on the conductor, there are also connected to the line individual modulators represented at 40, 42, 44, 46, 46a and 46b.

As described in the above-identified earlier Atkinson et al. application, the monitoring system functions by causing the line to carry the high frequency carrier waves applied by source 38, and causing the modulators to each impress a different low frequency rate of amplitude modulation on the carrier waves. At the monitoring location 38 the presence of each of these individual modulation frequencies is detected and separately indicated. In the event of a line outage, such as an open circuit due to the breaker, the modulations of modulators in the de-energized portions of the line will no longer be received at the monitor. Thus if the monitor suddenly shows the absence of the modulation of modulator 42 for example, while indicating the presence of the other modulations, it would be clear that an outage exists on section 30. If desired, additional modulators can be used to reduce the length of individual line sections being monitored.

As indicated in Fig. 1, a line conductor may be used as the monitor line, the carrier being impressed between this line conductor and ground or earth. In such case the ground functions as a second line conductor. If desired, however, the carrier can be impressed between a pair of line conductors that are not grounded. This pair of conductors may constitute a complete single phase transmission line, or may be part of a multiconductor or multiphase line.

The carrier and modulating frequencies are selected so as not to unduly interfere with the normal functions of the line or with established communication frequency channels. It has been found that a carrier frequency of about 30,000 to about 130,000 cycles per second, and modulation frequencies of from about 200 to about 10,000 or more cycles per second are highly satisfactory with power lines carrying the standard 60 cycle-per-second electric power.

Fig. 2 shows in essentially block diagram form, a combination high frequency source and monitor such as that represented at 38 in Fig. 1. A carrier source 50, the details of which may form no part of the present invention and are not shown but may be any convenient type of vacuum-tube or similar oscillator such as those well known in the art or shown in the above-identified Atkinson et al. application. The source 50 is coupled by transformer 52 to an output circuit formed by leads 54, 56. Lead 54 is connected with a line to be monitored through a capacitor 58 which acts as a low impedance to the carrier current and a high impedance to the 60-cycle power current. Lead 56 is connected to ground through an adjustable loading coil 60, the primary 62 of of a monitor input transformer 64, and a meter 66 which indicates the intensity of the carrier current and can be used to indicate proper adjustment of the circuit. Where the carrier current is impressed between one line conductor and the ground or earth, the meter 66 is actually connected to the ground. However, where the carrier current is impressed between ungrounded line conductors, meter 66 does not go directly to the earth, but merely to a common return conductor. In the latter case, the common return is connected to a second ungrounded line conductor, as by means of an additional power-blocking capacitor corresponding to capacitor 58.

Transformer 64 supplies the carrier, with any modulations that may be impressed on it, to a band-pass amplifier and demodulator assembly 70, usually energized by a direct current supply 72. This assembly may be of any convenient construction for selectively passing the modulated carrier waves and also demodulating them to separate the modulations from the carrier. The details of assembly 70 form no part of the present invention and suitable examples are shown in the above-identified Atkinson et al. application as well as in prior art radio receiver circuits. The output of assembly 70 is a carrier-free combination of any modulation present on the carrier, and is delivered by leads 74 to a monitor indicator 76, also operated by a direct current supply 78 which may be the same direct current supply shown at 72.

Fig. 3 shows the details of one form of monitor indicator according to the invention. Signal supplying leads 74 are connected to the ends of a plurality of parallel-connected potentiometers some of which are shown at 80, 81 and 82. An adjustable tap of each of these potentiometers supplies some or all of the signal to the input grid 83 of one of a corresponding number of cathode follower stages as shown at 84. The cathode 86 of this stage is connected through an output resistor 88 and a common return conductor 89 to one end of the potentiometer 80, while the anode 90 of stage 84 is directly linked to the positive terminal 92 of direct current supply 78. The negative terminal of the supply 78 is the common return conductor.

From the ends of the output resistor 88, the demodulated signals passed by stage 84 are delivered through a capacitor 93 to a contactless mechanically-selective low frequency transfer unit 94 which transfers only those signals in a selected frequency range, to the input resistor 96 of an amplification stage 98. The operation of unit 94 is more completely explained below in connection with Figs. 5, 6 and 7. In so far as the overall circuit operation is concerned, the input grid 100 and cathode 102 of stage 98 are connected to the opposite ends of resistor 96, a cathode biasing resistor 104 bridged by a signal-bypassing capacitor 106 being inserted in the connection from cathode 102. If desired, input resistor 96 may be bridged by a capacitor 108 to reduce the effect of any undesired high frequency waves which may be present.

Alternatively, resistor 96 with or without bridging capacitor 108 may be omitted where, as in the present case, the transfer unit 94 supplies a direct current return circuit for grid 100. Anode 110 of stage 98 is connected to the positive direct current lead 92 by way of a signal-loading impedance formed by the primary winding of a coupling transformer 112 and a parallel peaking capacitor 114. As is well known, by selecting a capacitor 114 that resonates with the inductance of the primary winding approximately or exactly to the amplified signals, the amplification is improved.

Signals selectively transferred by unit 94 are amplified by stage 98 and appear at the secondary of coupling transformer 112. Here they are fed through a rectifier 116 to a lead resistor 118 which is paralleled by a filtering capacitor 120. Neither end of resistor 118 is directly grounded to the common return conductor 89. One end, however, is joined to an adjustable tap of a grounded potentiometer 122 across which a direct current bias voltage is developed by a vacuum-tube stage 124 operated as a rectifier of alternating current supplied by transformer 126. Any convenient alternating current power supply such as the transmission line of Fig. 1 may be connected to supply transformer 126 as well as the direct current supply 78. Stage 124 is shown as a triode in which the grid 128 and the anode 130 are connected together to constitute one electrode of a diode, and cathode 132 is connected as the other electrode of the diode. A capacitor 134 bridging potentiometer 122 and an additional capacitor 135 across its adjustable tap filter out alternating current ripple from the bias voltage.

From across the resistor 118 the rectified amplified signals selected by unit 94 are impressed between the grid 136 and cathode 138 of a power amplifier stage 140. Grid 136 is directly connected to one end of the resistor 118 whereas the cathode 138 is connected through a circuit opening test jack 142, common current return 89 and the bias supplying portion of potentiometer 122. Anode 144 of stage 140 is returned to the positive direct current supply lead 92 through the windings of a control relay 146. The relay is shown as having a movable blade carrying a contact normally held, as by a spring bias, against fixed contact members 150 and 152. Upon energization of the windings, the movable blade is pulled away from its normal position to an energized position in which it holds a different contact against a third fixed contact member 154. As shown in the earlier filed Atkinson et al. application the various contacts of relay 146 may be connected so that in the energized position a green light is lit indicating the reception of the corresponding modulation frequency, while in the unenergized or normal position the contacts disconnect the green light and connect instead a red light as well as a buzzer or other audible signal generator to indicate misoperation.

The cathodes of stages 84, 98, 124 and 140 are shown in Fig. 3 as indirectly heated by separate filaments 156, 158, 160 and 162. Filaments 156 and 158 are connected in series to the output of transformer 126, and filaments 160 and 162 are also connected in a different series path to the same output. Stages 84 and 98 are shown as contained in a single electron-discharge tube envelope 99, while stages 124 and 140 are correspondingly shown combined in a different envelope 141, although either or both of these pairs of stages may be entirely distinct structurally if desired.

The adjustable contacts of potentiometers 81, 82, etc., are connected to similar selective and indicating circuits not shown in Fig. 3. The transfer units 94 of each individual indicating channel is arranged to selectively transfer a different range of modulation signals corresponding to the frequency of a different modulator of the monitoring combination shown in Fig. 1 for example.

An externally accessible lead such as a jack or socket 119 can be provided to more readily measure the bias and signal voltages. The stage 140 is adjusted for operation by inserting a meter in jack 142 and, while the signals are not received, moving the adjustable tap of potentiometer 122 until the meter indicates substantially complete stoppage of current flow. The arrival of the monitored signals can then be adjusted, as by potentiometer 80, to then supply grid 136 with a positive voltage sufficient to cause the passage of relay-energizing current.

A feature of the invention is the fact that the monitor of Fig. 3 is substantially fool-proof notwithstanding its dependence on locally-generated bias voltages. Thus if the bias output of rectifier stage 124 were to disappear, the grid 136 of stage 140 could not be held negative. Stage 136 would therefore remain conductive at all times and the relay 146 would be operated to falsely indicate the presence of monitor signals even when they are not received. However, by connecting the separate energizing filaments 160, 162 of the relay-control stage and the bias supply stage, so that these filaments are energized in series, this difficulty is substantially completely avoided. The interruption of current by the bias stage filament, the most likely cause of bias failure, will then be accompanied by deenergization of the relay-control stage 140 so that the relay will be rendered inoperative thereby showing misoperation.

Of course, failure of the incoming signals at any other part of its monitor path, including unit 70, stages 84, 98 or transfer unit 94, will also deenergize the relay to indicate misoperation.

For even greater assurance that the apparatus of the invention will indicate misoperation in a substantially fool-proof manner, the relay control or power amplifying stage 140 may have its plate or anode current also supplied by the rectifier stage 124. Thus the rectifier circuit may be arranged so that a high D. C. voltage is directly connected from the positive terminal of the rectifier output through the windings of relay 146 to anode 144, with the grounded cathode 138 returned through a suitable load resistance to the oppositely polarized rectifier output terminal. An additional bleeding resistance combination including a bias-supplying potentiometer is then connected across the rectifier output terminals in parallel with the relay control stage, an intermediate portion of this bleeding resistance being grounded. The bias voltage is taken from a suitable portion of the bleeding resistance that has a negative potential with respect to ground.

This arrangement will have the added feature of indicating misoperation regardless of the particular manner in which the rectifier should cease to function properly. Thus, for example, where the rectifier is of the vacuum-tube type and the rectifier cathode loses its electron emissivity to the point where the rectifier no longer delivers appropriate D. C. voltages, any loss of power amplifier bias will be accompanied by loss of current through the power amplifier stage. This loss of current will be severe enough to cause the indicator to shift to the condition showing misoperation.

It is, of course, impossible to make the apparatus completely fool-proof inasmuch as the indicator itself may become defective. The movable blade 148 may, for example, become stuck in contact with blade 154, as by welding of their contacts. This could of course not be discovered except by careful checking. Such a check can be made periodically and is very simply effected by merely momentarily opening up the monitoring circuit as, for example, at leads 74. A corresponding shift of the indicator in response to such momentary circuit interruption would show that the apparatus is functioning properly.

Fig. 4 illustrates a typical modulator circuit embodying the invention. A contactless mechanically selective low frequency transfer unit 194, which may be identical to the transfer unit 94 of Fig. 3 is here shown as connected in an oscillator circuit 195 for determining an oscillation frequency corresponding to the desired frequency of modulation. An oscillator stage 196 constitutes a part of the oscillator circuit. Grid 198 and grounded cathode 200 of this stage are connected by a grid return resistor 202. A blocking capacitor 204 also connects the grid 198 to the output lead 206 of transfer unit 194 and a second blocking condenser 208 connects the anode 210 of stage 196 with the input lead 212 of transfer unit 194. A common return lead 214 for both input and output of unit 194 is grounded and a peaking condenser 216 is connected across the output of the unit between leads 206 and 214.

The oscillator is operated by connecting the anode 210 of stage 196 through resistor 211 to the positive terminal 218 of a direct current supply, the negative terminal of which is grounded as indicated at 220. The direct current is supplied by any conventional arrangement, shown in this construction as a rectifier 222 having one terminal connected through current-limiting resistor 224 to one side of an alternating current supply circuit, and another terminal connected through filtering resistors 226, 228 to lead 218. The other side of the alternating current supply is directly connected to grounded lead 220 and through filtering capacitors 230, 232 to suitable parts of the filter resistor chain. A voltage regulator 234, shown in the form of a standard glow tube, is connected between leads 218 and 220 to assist in maintaining the direct current output voltage of a substantially constant value.

The oscillator develops a sinusoidally oscillating voltage having a frequency determined by the selective characteristics of the transfer unit 194, and this voltage is taken from anode 210 by means of coupling capacitor 236 and impressed across a grounded input potentiometer 238 of an amplification stage 240. The input grid 242 of this stage is connected to and adjustable tap on this potentiometer, while the cathode 244 is returned to ground through a cathode-biasing resistor 246 bridged by a signal-bypassing capacitor 248. Both stages 196 and 240 are shown as incorporated in a single tube 251.

The anode 250 of stage 240 is connected to the positive direct current lead 218 through the primary winding 252 of a transformer 254 where amplified oscillations are delivered. The secondary winding 255 of the transformer is connected at one terminal 256 to ground through capacitor 259, and to the anodes 258 of a rectifier shown in the form of a dual vacuum tube 260. The other terminal 257 of winding 255 is connected to the rectifier's cathodes 262 by way of a grounded bypass capacitor 264, and grounded adjustable inductor 266. A resistor 268 and an adjustable potentiometer 270 also return winding terminal 257 to ground, but are primarily used in conjunction with a voltage-dropping resistor 272 to apply a small portion of the direct current voltage at lead 218 to the anodes 258.

The ungrounded end of inductor 266 is linked to one lead of a capacitor 276, the other lead of which is connected to the monitored line. The capacitor 276 and inductor 266 are adjusted to be series-resonant at the frequency of the carrier applied to the line by source 50 (Fig. 2). Inasmuch as the monitored line may be at a very high potential with respect to ground conductor 220, the capacitor 276 is rated in accordance with the voltage rating of the monitored line. This permits the use of an inductor 266 having a relatively low-voltage construction. For increased safety, this inductor is bridged by a protective spark gap 278 designed to break down under the influence of excessive line voltages such as those caused by lighting discharges to the line. This prevents damaging of the apparatus by all kinds of high-voltage transients on the line.

The stages 196, 240 as well as the rectifier 260 are shown in Fig. 4 as having their cathodes indirectly heated by filaments energized by a filament transformer 278 connected to the power supply which may be the alternating electric power carried by the transmission line being monitored.

Capacitor 276 and inductor 266 are tuned to the frequency of the monitoring carrier, as by adjusting the inductance of the inductor, with the remainder of the circuit effectively or actually disconnected. When the modulator is linked to the monitored line, the carrier signal appears at the junction 267 of inductor 266 and capacitor 276, and is rectified by rectifier 260. A negative voltage, corresponding to the amplitude of the carrier at junction 267, is thereby developed at the rectifier anodes 258 and can be measured at an externally accessible test point 269. Such measurement is made with the movable contact of potentiometer 270 at ground potential. The movable contact of potentiometer 270 is then moved to a position at which it supplies a positive bias voltage from the direct current supply 218. If this bias is adjusted until the negative voltage at point 269 is one-half of the zero-bias (original) voltage, and the potentiometer 238 then adjusted until the negative voltage of this point comes back to exactly, or just below, the original zero-bias voltage, the carrier is modulated substantially 100%, as will be obvious to those skilled in the art. If desired other degrees of modulation may also be used.

The modulation of the invention is effected by reason of the fact that the voltage of the rectifier anodes 258 with respect to the cathodes 262 is sinusoidally varied from a positive or zero-voltage value to a negative value. At the negative value the anode-to-cathode path of the rectifier 260 is substantially an open circuit and does not affect the series-resonant combination of capacitor 276 and inductor 266. At the positive (or zero) anode-cathode potential the rectifier presents a very low impedance and thereby effectively connects capacitor 259 across the inductor 266. The combination of winding 255, capacitor 264, resistor 268 and lower tapped section of potentiometer 270 is in parallel with capacitor 259 but can be made of only minor effect by presenting a higher impedance to currents of carrier frequency. Capacitor 259 is selected to present a relatively low impedance to the carrier currents so that the inductor 266 is effectively bypassed.

It will accordingly be seen that the carrier loading circuit 276, 266, sinusoidally varies between a series resonant condition at one extreme, and another extreme at which it is essentially only a capacitor 276, the inductor 266 being bypassed. In the series resonant condition, the impedance to the carrier frequency is very small, being only the reactance-free resistance of elements 276 and 266. The capacitor 276 by itself, however, is arranged to be a relatively high impedance to carrier currents. A one thousand ohm reactance capacitor is highly effective although other values are also suitable. The above sinusoidal variations in loading cause the carrier amplitude on the monitored line conductor to vary in inverse sense but at a corresponding frequency or rate. It is these modulations that are detected by the monitor.

Fig. 5 is a view of a contactless mechanically selective low-frequency transfer unit suitable for use with the invention. A dielectric base 300 is here shown as a sheet carrying a plate 302 held in a spaced relation by the elongated spacer studs 304. Secured below the plate 302 is a shelf 306 held by short spacers extending between the rear portions of the plate and shelf and not visible in this view. Mounted over a pair of openings 308 in plate 302 there are separately held generally U-shaped permanent magnets 310 secured by screws 312 whose shanks pass through suitably provided passageways in the magnets and under whose heads retaining washers 314 are placed.

A pair of coils 316, 318 wound on forms 320 are clamped between the top of shelf 306 and the lower surface of the respective magnets 310, the top of the forms being received within plate openings 308. Depending from the rear of the shelf 306 is a bar 322 fixedly held in place by screws 324 and providing at its lower portion a rigidly held pivot in the form of a screw 326 extending perpendicularly to the bar 322 and in a plane parallel to the base 300 and shelf 306. A block 328 is yieldably mounted on the shank of the screw 326 between rubber bushings 330 which are in turn clamped between the bar 322 and a washer 332 at the head of the screw. The block 328 is accordingly securely held in place but is capable of transmitting vibration from one end to the other.

The block 328 carries near each end upwardly-extending reeds 334, 336 shown as secured, as by soldering, in slots cut in the upper edge of the block. The reeds 334, 336 project upwardly through the centers of the coil forms 320 to a point approximately midway between the poles of the respective magnets 310. These poles are indicated by the letters "N" and "S" which represent the respective north and south magnetic poles.

Each coil 316, 318 has a pair of leads each of which is shown as connected to a separate hollow pin 338 anchored to and projecting from the bottom of the base 300 as by being crimped in place. A generally cylindrical cover 340 preferably of magnetic shielding material such as steel may be fitted over the unit with its lower edge grooved and spun around the base 300 to complete the assembly.

In operation the leads to one coil, 316 for example, become the input conductors. The leads to the other coil are the output conductors. The reeds 334, 336 are of magnetic metal such as steel and each reed is adjusted so that they show an identical natural period of vibration. Such adjustments can be readily made by filing or grinding down portions of the reed preferably near the upper end, or by wetting the reed with a small amount of liquefied solder, and then cooling to cause the solder to solidify.

When incoming electric signals are supplied to the input coil 316, a magnetic flux is generated by the coil and concentrated in magnetic reed 334. Accordingly the upper end of reed 334 becomes alternately a north and south magnetic pole, the alternations conforming to the frequency of the impressed signal. When it is a north pole it is repelled from the north pole of its magnet 310 and moved to the left towards the south pole of this magnet. Conversely when the upper end of the reed becomes a south magnetic pole it is repelled from the south pole of its magnet and moved to the right towards its north pole. The reed will accordingly be subjected to a forced vibration at the frequency of the incoming signal. However unless the vibration is relatively close to the natural frequency of vibration of this reed, the amplitude of vibration will be relatively small. In any event all the induced vibrations of reed 334 will be transmitted by block 328 and appear at the anchored end of output reed 336. The top of the output reed 336 will not be caused to undergo any significant amount of vibration unles the vibrations applied at its lower anchored end are exceedingly close to its natural frequency. When the output reed 336 does vibrate, its upper end moves alternately closer to the north pole and then to the south of its magnet 310. Accordingly an appreciable portion of the magnetic flux from this magnet first travels from its north pole for example, vertically downward along the reed and at least partially through the coil, leaking off and finding its way to the south pole of the same magnet 310. Conversely during the oppositely directed swing of the reed 336, flux from the north pole of its magnet finds its way through the coil and into a portion of the reed below the top, continuing upwardly through the reed and then to the closely-positioned south pole of this magnet. This variation of flux in output coil 318 as a result of the vibration of the reed 336 is of sinusoidal nature and induces correspondingly sinusoidal electrical voltages between the terminals of output coil 318.

It will be accordingly clear that no matter what signals are impressed on the terminals of input coil 316, the only time tthat electrical signals appear at the output of coil 318 is when there is included in the incoming signals some electrical oscillations having a frequency closely corresponding to the natural frequency of the reeds.

By reason of the avoidance of circuit-breaking contacts, the oscillations developed by the oscillator 196 contain very little harmonic or other distortion and are very pure, being of essentially only a single frequency. Furthermore the modulation system of the invention sinusoidally varies the carrier current at the frequency of these pure oscillations so that the modulations are sharply selective.

Moreover the selective transfer unit 94 of the monitor section also shows the same sharp selectivity. This selective action has been discovered to be so sharp that in a single octave of frequencies about 24 different signal frequencies can be clearly differentiated from each other. In fact in the modulation frequency range of from 200 to 1000 cycles per second the remote modulating system of the invention can be used to modulate 53 different conditions or, in the case of the transmission line of Fig. 1, 53 different line sections. This is about four or more times the corresponding number of modulation frequencies available in the same range when using transfer circuits depending upon vibrating circuit-breaking contacts.

Figs. 6 and 7 show a modified form of a transfer unit in which even sharper separation can be effected. This modified construction is shown in fragmentary form as having a block 428 resiliently held on a pivot 426 that extends parallel to a pair of reeds 434, 436 held on the block. The mounting of the reeds may be similar to that shown in the construction of Fig. 5. As in the earlier figure, a pair of coils 416, 418 are held in place around the upper portions of the respective reeds. In front and in back of each coil there are aligned with each reed a pair of bar magnets 410, 411 as more clearly shown in Fig. 7. These magnets are shown as extending upwardly to points just above and downwardly to points just below the individual coils. Above the coils are also located a pair of magnetic plates 450, 451 shaped to provide magnetic north and south poles on either side of the respective reed ends and generally in the plane of reed vibration. Below the coils there may be correspondingly located additional pairs of magnetic plates 460, 461 as more completely shown in Fig. 6.

The operation of the construction shown in Figs. 6 and 7 follows along the same lines as those described above in connection with Fig. 5 but appears to be somewhat better. The improvement is probably at least partially due to the fact that block 428 shows very little tendency to vibrate as a unit with both reeds 434, 436, in the plane of individual reed vibration. This unitary vibration can more readily be forced by externally-impressed signals, but is restricted by the location of block vibration axis 426 itself in the plane of reed vibration. Advantages are probably also due to the fact that the magnetic circuits for the magnetic reeds are more fully divorced from each other in the construction of Figs. 6 and 7, and each individual magnetic circuit is more closely tied to the corresponding permanent magnet through a smaller overall air gap.

Without limiting the invention in any way, and merely to enable others to more readily practice the present invention, there are given below details of circuit constructions that have proven satisfactory:

Modulator (Fig. 4)

| Component: | Value |
|---|---|
| Resistor 202 | 1,000,000 ohms |
| Resistor 211 | 150,000 ohms |
| Resistor 224 | 18 ohms |
| Resistor 226 | 200 ohms |
| Resistor 228 | 1,500 ohms |
| Resistor 246 | 330 ohms |
| Resistor 268 | 100,000 ohms |
| Resistor 272 | 68,000 ohms |
| Potentiometer 238 | 250,000 ohms |
| Potentiometer 270 | 50,000 ohms |
| Capacitor 204 | 0.1 microfarad |
| Capacitor 208 | 0.05 microfarad |
| Capacitor 216 | 0.002 microfarad |
| Capacitor 230 | 50 microfarads |
| Capacitor 232 | 50 microfarads |
| Capacitor 236 | 0.05 microfarad |
| Capacitor 248 | 125 microfarads |
| Capacitor 259 | 0.1 microfarad |
| Capacitor 264 | 0.0002 microfarad |
| Capacitor 276 | 0.002 microfarad |
| Inductor 266 | 1.5 to 2.5 millihenries |
| Tube 210 | type 12AU7 |
| Tube 234 | type OB2 |
| Tube 260 | type 6AL5 |
| Rectifier 222 | 117 volt selenium rectifier |
| Transformer 278 | 5 volt output |
| Power supply | 110 volt (nominal) A. C. |

Monitor

| Component: | Value |
|---|---|
| Resistor 88 | 350 ohms |
| Resistor 96 | 1,000,000 ohms |
| Resistor 104 | 350 ohms |
| Resistor 118 | 200,000 ohms |
| Potentiometer 80 | 1,000,000 ohms |
| Potentiometer 81 | 1,000,000 ohms |
| Potentiometer 82 | 1,000,000 ohms |
| Potentiometer 122 | 10,000 ohms |
| Capacitor 93 | 25 microfarads |
| Capacitor 106 | 25 microfarads |
| Capacitor 108 | 0.0025 microfarad |
| Capacitor 114 | 0.02 microfarad |
| Capacitor 120 | 0.1 microfarad |
| Capacitor 134 | 25 microfarads |
| Capacitor 135 | 25 microfarads |
| Relay 146 | 5,000 ohm winding, 4 milliamperes required for closing |
| Tube 99 | type 12AU7 |
| Tube 141 | type 12AU7 |
| Transformer 112 | Step-up turns ratio 1:3 with a primary winding of 10,000 ohms impedance |
| Transformer 126 | 12.6 volt output |
| Rectifier 116 | type 1N38 |
| D. C. supply | 135 volts |

The above circuits operated extremely effectively with a carrier current having a frequency of 80,000 cycles per second, but are not limited to this particular frequency and can be operated at any desired frequency.

The present invention is not limited to the specific forms described above. Thus rectifier 260 of the modulator may have only a single anode and a single cathode, or may be of the metal contact or any other suitable type, or may be a bias controlled rectifier of the type having a separate bias electrode such as a grid-controlled triode, tetrode or pentode, or a transistor. In the grid-controlled modifications, the bias signals are applied to the control grid while the modulating load circuit can be separately completed through the anode and cathode. Correspondingly the tubes 251, 99 and/or 141 may be replaced by others and the separate amplification or electron discharge sections contained in any or all of these tubes may be housed in independent tube envelopes as is well known. Instead of supplying oscillator signals to the modulating rectifier by means of a transformer, as at 254, a resistance-coupled or choke-coupled circuit can also be used. Although specific details of a direct-current power supply are shown in Fig. 4 many other types are equally as satisfactory. Rectifier 116 in the monitor of Fig. 3 may be an electron tube unit and conversely the rectifier 124 in this figure may be of any other suitable type such as a metal contact rectifier. Instead of inserting relay 146 in the plate (anode) circuit of an amplification stage it may be connected as part of the cathode circuit. The relay circuit of the monitor may likewise be of any other suitable type, such as a thyratron, or similarly operated circuit. The relay itself may be an electron-discharge stage of any of the above types so that no moving members or switch contacts are needed. Any or all of the various tube filaments may be connected for operation at voltages somewhat below rated voltage as shown in connection with Fig. 4 above so as to prolong the life expectancy of the tubes. This is particularly desirable for the modulators which are remotely located and more awkward to service.

The contactless mechanically selective low-frequency transfer unit may also be subject to wide variation. The transfer unit may for example contain only a single reed, portions of which are coupled to the respective input and output circuit. Instead of developing output signals by shifting a concentrated magnetic flux, the transfer units may be connected to supply output signals as a variable reluctance, piezoelectric, or similar signal generator, as by arranging that the reeds sinusoidally vary the magnetic reluctance of a circuit so that an impressed direct current voltage correspondingly changes in magnitude. The unit itself may be adjusted for operation at frequencies as low as and as high as desired. In place of the reed-like vibrating elements, thicker members along the line of tuning fork vibrators may be used, particularly for the higher frequencies such as those above 1000 cycles per second.

The various features of the invention may be used independently, or in subcombinations. The relay may for example be connected for signalling misoperation when its windings are energized, or the series-energized interconnection of relay-control and bias supply circuits can be omitted. Furthermore the contactless mechanically-selective low frequency transfer unit may be used only in the modulator or only in the monitor section. Thus where the monitoring system is used for checking a varying liquid level at a remote location or at a location where a human observer may be unduly endangered, the modulator system may be a single variable frequency modulator in which the modulation frequency is varied in response to changes in level. The highly selective transfer circuit of the invention can then be used at the monitor section to accurately indicate the level with only a very small band of modulation frequencies. A single carrier can then be used to carry a multiplicity of such adjacent bands to simultaneously monitor a number of different levels with or without other types of operation such as the power transmission described above.

As many apparently widely different embodiments of this invention may be made without departing from the spirit and scope hereof, it is to be understood that the invention is not limited to the specific embodiments hereof, except as defined in the appended claims.

What is claimed is:

1. In a remote monitoring system for checking, at a single location, on a plurality of operating conditions in remotely located apparatus having electrical communication elements transmitting an alternating carrier current between said apparatus and said single location, and modulation structure for connection to said communication elements to modulate the amplitude of said carrier current at selected audio frequencies without substantially affecting the carrier frequency, the combination in which said modulation structure includes a contactless mechanically tuned selective audio frequency transfer unit connected to control the modulation rate in accordance with the mechanically selected audio frequency; and said combination having an indicating device including a contactless mechanically tuned selective audio frequency transfer unit for connection at said single location to said communication elements to selectively detect, identify, and indicate the presence of the corresponding amplitude variation rates in the carrier currents.

2. The combination of claim 1 in which each of the transfer units has a pair of magnetic reeds separately linked to input and output leads respectively, and the reeds are carried by a block held on a rubber mount to transmit mechanical vibrations from one reed to the other.

3. In a remote monitoring system for checking, at a single location, on a plurality of remotely located portions of an elongated electrical power transmission line on which is impressed a high frequency carrier current, said system having a modulator at each of the remotely located portions for modulating the amplitude of the carrier current at a different audio frequency without substantially affecting the carrier frequency, the combination in which the modulators each include a contactless mechanically tuned selective audio frequency transfer unit connected to establish the modulation rate of that modulator at the mechanically tuned frequency, the combination also including an indicating device having a plurality of contactless mechanically tuned selective audio frequency transfer units connected to the transmission line at said single location to selectively detect, identify and indicate the presence of the corresponding amplitude variation rates in the carrier current.

4. The combination of claim 3 in which the indicating device has a pair of input leads for receiving a mixture of the audio frequency signals supplied by the transmission line, each of the plurality of contactless mechanically tuned selective audio frequency units has input windings linked with a separate magnetic reed; a multiplicity of output circuits are separately connected to the respective individual units for separately indicating the passage of the individual selectively passed signals, and all the input windings are coupled to the input leads by way of independent cathode-follower signal-transfer stages.

References Cited in the file of this patent

UNITED STATES PATENTS

| Number | Name | Date |
|---|---|---|
| 1,708,945 | Horton | Apr. 16, 1929 |
| 2,148,578 | Pullis | Feb. 28, 1939 |
| 2,181,803 | Faus | Nov. 28, 1939 |
| 2,192,242 | Robinson et al. | Mar. 5, 1940 |
| 2,354,902 | Wolferz | Aug. 1, 1944 |
| 2,404,401 | Plensler | July 23, 1946 |
| 2,420,093 | Place | May 6, 1947 |
| 2,420,232 | Deal | May 6, 1947 |
| 2,498,577 | Rambo | Feb. 21, 1950 |
| 2,510,982 | Kandoian | June 13, 1950 |
| 2,526,595 | Watts | Oct. 17, 1950 |
| 2,532,870 | Volz | Dec. 5, 1950 |
| 2,662,126 | Henson | Dec. 8, 1953 |